Patented Nov. 1, 1932

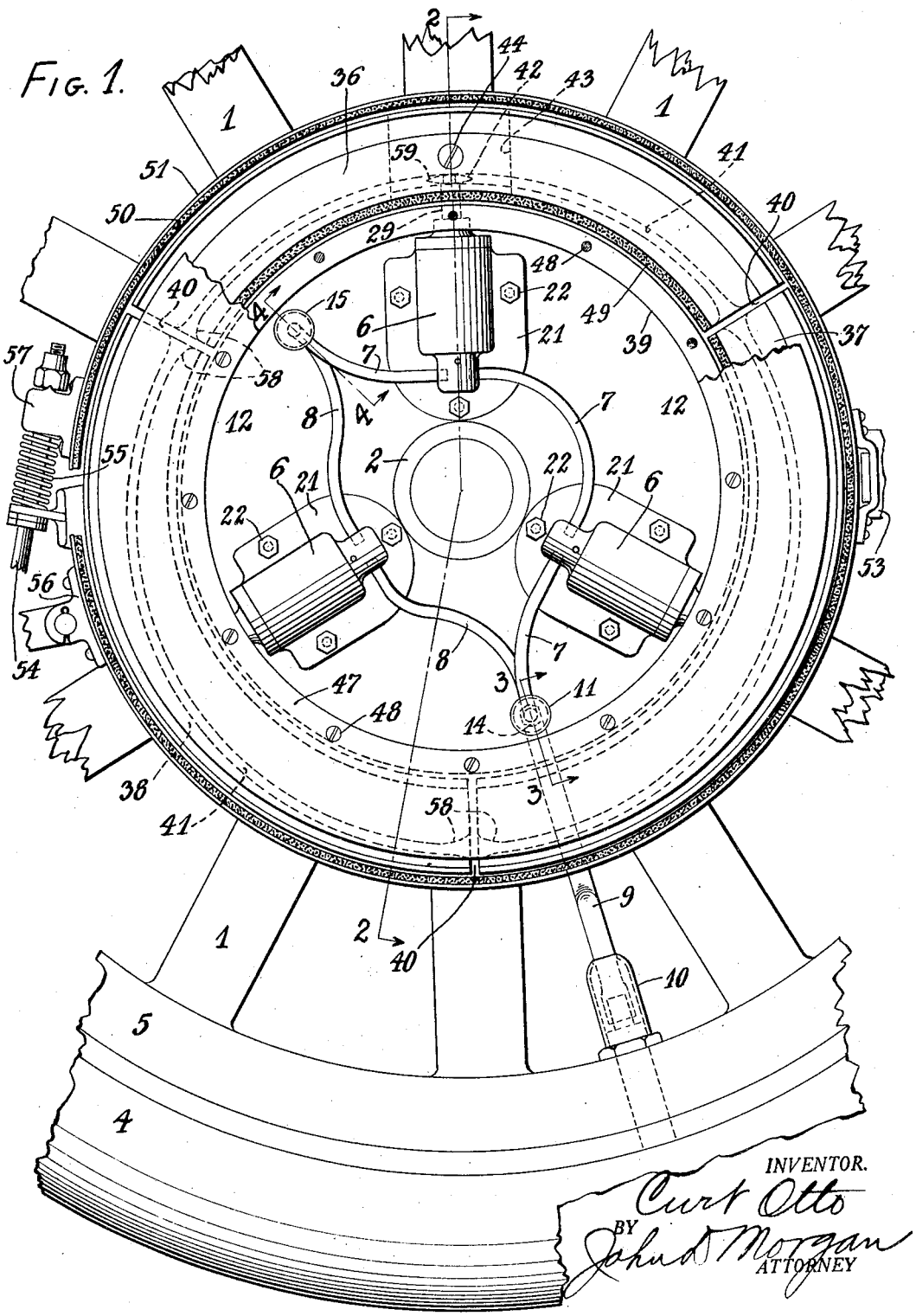

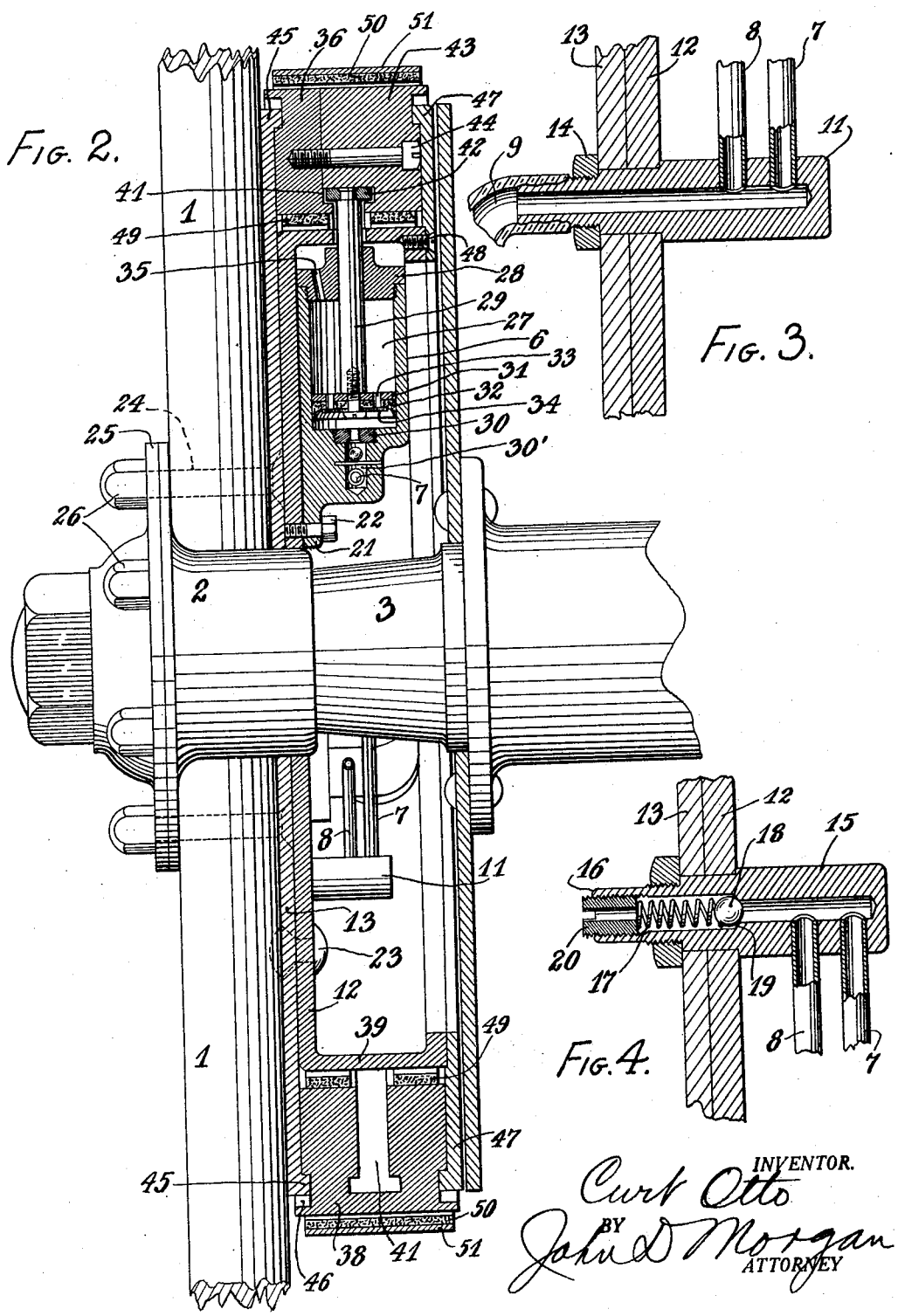

1,885,284

UNITED STATES PATENT OFFICE

CURT OTTO, OF NEW YORK, N. Y.

VEHICLE TIRE PUMP

Application filed August 31, 1928. Serial No. 303,222.

The invention relates to a novel and useful mechanism for inflating a pneumatic tire on a vehicle wheel, and more particularly to a tire inflating mechanism adapted to operate while the vehicle is in motion.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, construction, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 1 is an elevation of portion of a vehicle wheel provided with mechanism embodying the invention, parts being broken away for the sake of clearness;

Fig. 2 is a vertical section taken along line 2—2 of Fig. 1;

Fig. 3 is a fragmentary detail section somewhat enlarged, taken on line 3—3 of Fig. 1; and Fig. 4 is a similar fragmentary section on line 4—4 of Fig. 1.

The invention is directed to a simple and efficient mechanism for inflating and maintaining a constant pressure in a pneumatic tire of the type in common use on the wheels of automotive vehicles, operable automatically during the motion of the vehicle and requiring absolutely no attention nor control from the operator of the vehicle.

The invention is further directed to a device which is adapted for use with any vehicle wheel of the ordinary type equipped with a pneumatic tire, said device requiring a minimum of change from standard construction and parts and being composed of very simple elements.

Broadly considered the present preferred embodiment of the invention comprises one or more pumps mounted on a vehicle wheel and connected to the inner tube of the pneumatic tire. The pumps are preferably of the reciprocating-plunger type, the plungers being actuated by an eccentrically grooved member normally rotating freely with the wheel, but adapted to be held from free rotation with the wheel, or to rotate at a different angular velocity from that of the wheel, whereby the freely rotating pump plungers engaging the eccentric groove are given a reciprocating motion to operate the pumps. The eccentrically grooved member is preferably connected to the vehicle brake, whereby operation of the brake holds the grooved member from free rotation with the wheel.

It will be understood that the foregoing general description, and the following detailed description as well, are explanatory and exemplary of the invention, but are not restrictive thereof.

Referring now in detail to the embodiment of the invention illustrated by way of example in the accompanying drawings, the present preferred embodiment thereof is shown as applied to a common type of automobile wheel having spokes 1 and a hub 2 by which the wheel is supported on the axle housing 3 of an automobile or other vehicle. The wheel is provided with a pneumatic tire 4 of any suitable or known type, suitably attached to the rim 5 of the wheel.

As embodied, the invention provided one or more pumps 6 mounted to rotate freely with the wheel and connected to the tire 2 for maintaining inflation thereof. Suitable air conduits are provided for conducting air from the compression cylinder of the pumps to the tube of the tire, comprising tubes 7 and 8 of metal, rubber or other suitable material arranged to tap the compression cylinders of the pumps 6 and leading therefrom to a common conduit 9 which in turn communicates with the tire tube through a suitable valve stem 10 mounted on the wheel rim 5.

As more clearly shown in Fig. 3, the junction between tubes 7 and 8 and conduit 9 is effected by tube member 11 into which the tubes 7 and 8 empty, the member 11 being securely fitted into the end of conduit 9 and having its other end closed. The tube member 11 is journaled in plates 12 and 13 and held in close contact therewith by threaded washer 14.

Means are provided by the invention whereby a predetermined pressure may be maintained in the tire tube and any pressure in excess thereof will be automatically relieved so that it will be impossible for the tire to be pumped beyond the proper pressure. As embodied, the tubes 7 and 8 have a relief outlet corresponding in structure to that just described, wherein, as shown in Fig. 4 the outlet ends of tubes 7 and 8 discharge into tube member 15 having a closed end and being supported in plates 12 and 13 in the same manner as tube member 11. The open or outlet end 16 of tube member 15 is provided with a spring mounted release valve having a spring 17 and a ball 18, the ball being normally held against a suitable conforming seat formed by the shoulder 19 of the tube member. A screw threaded apertured plug 20 is adapted to engage with the conforming screw threaded outlet end 16, having spring 17 fastened thereto, whereby the turning of the plug 20 in its threads serves to vary the compression on the spring to vary the predetermined pressure at which the ball is forced from its seat by the compressed air to relieve the pressure in the tire tube.

Referring now to the mounting of the pumps whereby the pumps are adapted to rotate freely with the wheel, each pump 6 is provided with a flanged base 21, said base being fixed to disc 12 by capscrews 22. The disc or plate is fixedly secured to an outer plate 13 by rivets 23, the plate 13 being in turn firmly fixed to the wheel to rotate therewith by means of countersunk bolts 24 which are attached to hub flange 25 by suitable nuts 26.

The pumps are of a single reciprocating-plunger type, having the air-compression cylinder 27 formed as an integral part of the block 6, the outer end of the cylinder being closed by threaded plug 28, centrally apertured for sliding movement of the plunger stem 29. The lower or inner end of the compression cylinder is provided with a small vent formed as a central orifice in screw-threaded plug 30, said orifice communicating with a chamber 30' into which the tube 7 opens. The pump plunger has a head 31 threaded to closely conform with the cylinder walls and provided with a washer or piston ring 32 of leather or other suitable flexible material to keep the plunger head airtight. The plunger head is also provided with means for releasing the air compressing force on the upward or exhaust stroke of said means comprising holes 33 in the piston head, having flap valves 34 of leather or the like, whereby the holes 33 are closed on the down or compression stroke and open on the upstroke of the piston. A release vent 35 is also provided in the plug 28 for permitting the escape of air on the exhaust stroke.

Referring now to the means provided by the invention for actuating the pumps during rotation of the wheel, a cam groove eccentric to the axis of the wheel and adapted to act as a trackway for the pump plunger actuating devices is mounted on the wheel to normally rotate freely therewith, but having cooperating actuating means whereby the cam groove may be held stationary with respect to the rotating wheel or may be made to turn at a relatively less angular velocity than that of the wheel.

In the embodied form, the wheel is provided with a plurality of arcuate segmental block members 36, 37 and 38 which are supported by an inwardly extending flange or shoulder 39 of the plate 12. The segmental block members normally have a slight circumferential gap 40 between their respective ends. A T-shaped groove 41 is provided in the blocks, the groove being of varying depth at different parts of the blocks, whereby there is provided a trackway or channel eccentric to the axis of the wheel and describing a curve entirely about the wheel centre. The eccentricity of the groove or channel 41 is substantially the ration of the depth of one of the segmental blocks to the radius of the wheel—that is, the innermost point of the eccentric groove is shown in Fig. 1 at the inner periphery of block 36, while diametrically opposite at the outer peripheries of blocks 37 and 38, the groove 41 is shown with its greatest radius.

The pump-plungers are adapted to fit within and travel along the eccentric groove 41, each plunger 29 extending radially outwardly through an aperture in the shoulder 39 and being provided with a T-head 42 adapted to fit within and loosely conform to the cross section of the T-shaped groove or trackway 41. To facilitate assembly of the pump unit and segmental blocks, a portion of the segmental block 36 is cut away and occupied by a removable block member 43, which is detachably fixed to block 36 by means of a countersunk screw 44. It will be understood that all the pump plungers may be fitted into the trackway 41 by removing the block 43 and feeding the segmental blocks 36, 37 and 38 around the wheel to permit assembly of all the plunger heads through the opening in block 36. The segmental blocks are farther held in rotatable relation to the wheel by means of a flange or shoulder 45 on circular plate 13 which fits into a corresponding circular groove 46 in the outer face of the segmental blocks, said groove being substantially wider than the shoulder 45 to permit inward radial movement of the segmental blocks. A corresponding block retaining member 47 is provided for the inner face of the blocks, being annular in shape and being secured to shoulder 39 of plate 12 by set screws 48.

Referring now to the embodied mechanism for effecting relative angular movement between the segmental blocks and the rotating wheel and for holding the segmental blocks stationary with respect to the wheel, each of the blocks 36, 37 and 38 is provided with a brake band 49 of friction material on the inner periphery of the block, said brake band being adapted to bear against the outer periphery of shoulder 39 of plate 12 upon inner radial movement of the segmental blocks. As hereinbefore explained, the disc or plate 12 is firmly secured to the wheel to rotate therewith. As embodied, the brake band 49 is formed into two parallel strips, attached to the faces of the segmental blocks on either side of the groove 41.

The wheel is provided with any standard or known type of brake band, the embodied form comprising a circular strip of friction material 50 and an outer metal strip 51, said brake band being adapted to surround and lie against the outer peripheral surfaces of the segmental blocks 36, 37 and 38. The brake band may be provided with any suitable type of anchor indicated at 53. Braking force may be applied to the outer brake band 50 by any known mechanism, the rod 54 and spring 55 being shown attached to the normally spread-apart ends of the brake band at 56 and 57, said rod being attached to any suitable brake actuating mechanism for effecting the constriction of the brake band about the segmental blocks. While the invention is shown as applied to a brake of the external contracting type, it will be understood that the invention is equally applicable to a brake of the inner expansion type, or to any other known form.

From the foregoing it will be understood that means are provided by the invention for holding the segmental blocks from turning freely with the wheel upon application of the vehicle brake, the amount of retardation and holding of the segmental blocks being determined by the relative constrictive force applied to the outer brake band. In operation, the application of constrictive force to the outer brake band causes the segmental blocks 36, 37 and 38 to move radially inwardly and draw together and causes their inner peripheral surfaces, upon which the brake band 49 is mounted, to engage with the periphery of the shoulder 39, which thereby constitutes an effective brake drum for the wheel. It will be understood that the transmission of the braking force from the outer band through the segmental blocks to the drum 39 causes the whole assembly of outer and inner brake bands of 50 and 49 respectively and the intervening segmental blocks to act as a single unitary brake band, whereby the segmental blocks are held from rotation with the wheel during the application of the brake band 50.

As a result, due to the relative rotation between the segmental blocks and the wheel during application of the brake, the pumps which rotate freely with the wheel at all times will turn relatively to the eccentric trackway 41 and the plunger-heads 42 riding therein will be caused to reciprocate due to the eccentricity of the trackway. In order to effect smoothness of operation, the grooved trackway 41 is widened and made bell-shaped at the junction faces 40 of the segmental block as shown at 58. The heads 42 of the pump-plungers are also lozenge-shaped in cross section, having reduced ends 59, whereby the transitional movement from the end of one segmental block to beginning of the adjacent block is effected smoothly and without clashing of the cooperating parts.

In order to compensate for the differences in weight of the segmental blocks, due to the fact that the eccentric groove 41 causes a greater removal of material in some blocks than in others, and due also to possible differences in centrifugal force on the eccentric solidity of the blocks, a static and dynamic balancing of the blocks may be provided. Preferably one or more of the blocks may be grooved or cut away on their outer peripheries or along the sides to accomplish the desired compensating effect.

It may sometimes be desirable to hold the segmental blocks stationary relative to the wheel independently of the braking means, and independently in each wheel. For instance, in case one tire develops a slow leak, the driver may wish to keep a certain pressure in that tire independent of the pumping effect of the braking operation and independent of the inflation of the other tires.

Various mechanisms may be employed for effecting the purpose described. For example, the blocks may be linked together and an expansible spring mechanism mounted on one of the blocks, whereby the blocks may be expanded to bear against the outer brake band 50 and thus hold the blocks stationary relative to the rotating wheel. The described mechanism may also serve to normally hold the blocks in a slightly expanded position, whereby undesired play and rattling of the parts is prevented. It will be understood that many other types of mechanism may be employed for the purpose described, the foregoing being illustrative but not restrictive of the invention.

The invention in its broader aspects is not limited to the specific mechanisms shown and described but departures may be made therefrom within the scope of the accompanying claims without departing from the principles of the invention and without sacrificing its chief advantages.

What I claim is:

1. A mechanism for inflating vehicle tires, including in combination a vehicle wheel having a pneumatic tire, a pump on the wheel having a reciprocating plunger, a braking device for the wheel, and an eccentric member on the braking device for reciprocating the plunger when the brake is operated.

2. A mechanism for inflating vehicle tires, including in combination a vehicle wheel having a pneumatic tire, a pump on the wheel having a reciprocating plunger, a braking device for the wheel, and an eccentric cam groove on the braking device for reciprocating the plunger when the brake is operated.

3. A mechanism for inflating vehicle tires, including in combination a vehicle wheel having a pneumatic tire, a pump on the wheel, a braking device on the wheel comprising a plurality of segmental brake members, said segmental members having an eccentric device for actuating the pump when the brake is operated.

4. A mechanism for inflating vehicle tires, including in combination a vehicle wheel having a pneumatic tire, a pump on the wheel, a braking device on the wheel comprising a plurality of segmental brake members normally turning freely with the wheel, said segmental members having an eccentric device for actuating the pump when the brake is operated.

5. A mechanism for inflating vehicle tires, including in combination a vehicle wheel having a pneumatic tire, a pump on the wheel having a reciprocating plunger, a brake drum on the wheel, a brake band, segmental brake members between the brake drum and the brake band and having an eccentric groove therein for reciprocating the plunger when the brake is operated.

6. A mechanism for inflating vehicle tires, including in combination a vehicle wheel having a pneumatic tire, a pump on the wheel having a reciprocating plunger, braking members for braking the wheel, and segmental brake members between the braking members and having an eccentric portion for reciprocating the plunger when the brake is applied.

7. A mechanism for inflating vehicle tires, including in combination a vehicle wheel having a pneumatic tire, a pump mounted on the wheel and connected with the tire and having a reciprocating plunger, a brake drum mounted on the wheel, a brake band, segmental members loosely mounted between the brake band and brake drum and having an eccentric groove therein, and means for operating the plunger by the eccentric when the brake is applied to retard the rotation of the wheel.

In testimony whereof, I have signed my name to this specification.

CURT OTTO.